United States Patent [19]

Johannesson

[11] 4,087,788
[45] May 2, 1978

[54] DATA COMPRESSION SYSTEM

[75] Inventor: Brian J. Johannesson, Waterloo, Calif.

[73] Assignee: NCR Canada Ltd - NCR Canada Ltee, Mississauga, Calif.

[21] Appl. No.: 759,604

[22] Filed: Jan. 14, 1977

[51] Int. Cl.² ............................................. G06K 9/12
[52] U.S. Cl. ................ 340/146.3 AE; 340/146.3 MA
[58] Field of Search ........... 340/146.3 AE, 146.3 AL, 340/146.3 D, 146.3 H, 146.3 ED, 146.3 MA

[56] References Cited

U.S. PATENT DOCUMENTS

| 3,987,412 | 10/1976 | Morrin | 340/146.3 AE |
| 4,020,463 | 4/1977 | Himmel | 340/146.3 AE |

OTHER PUBLICATIONS

Frank, "High Fidelity Encoding of Two-Level, High Resolution Images," *IEEE Int. Conference on Communications*, 6-73. pp. 26-5 to 26-10.

*Primary Examiner*—Leo H. Boudreau
*Attorney, Agent, or Firm*—J. T. Cavender; Wilbert Hawk, Jr.; Richard W. Lavin

[57] ABSTRACT

A data compression system is disclosed in which the left-hand boundary of a character is developed in the form of a sequence of Freeman direction codes, the codes being stored in digital form within a processor. The number of binary data bits required to define the character using different criteria is then generated and compared to determine which criteria defines the character in the minimum amount of binary data bits.

16 Claims, 16 Drawing Figures

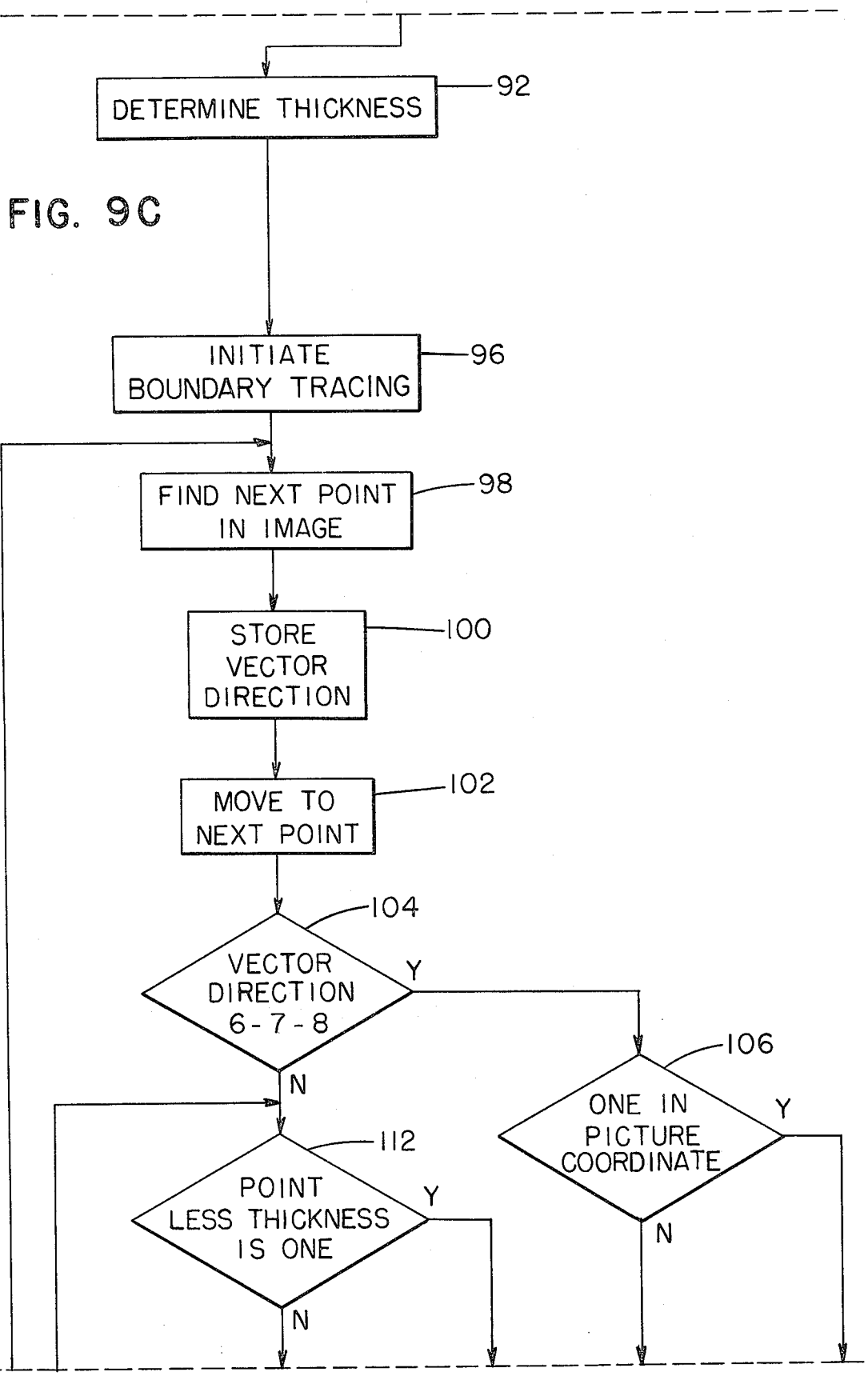

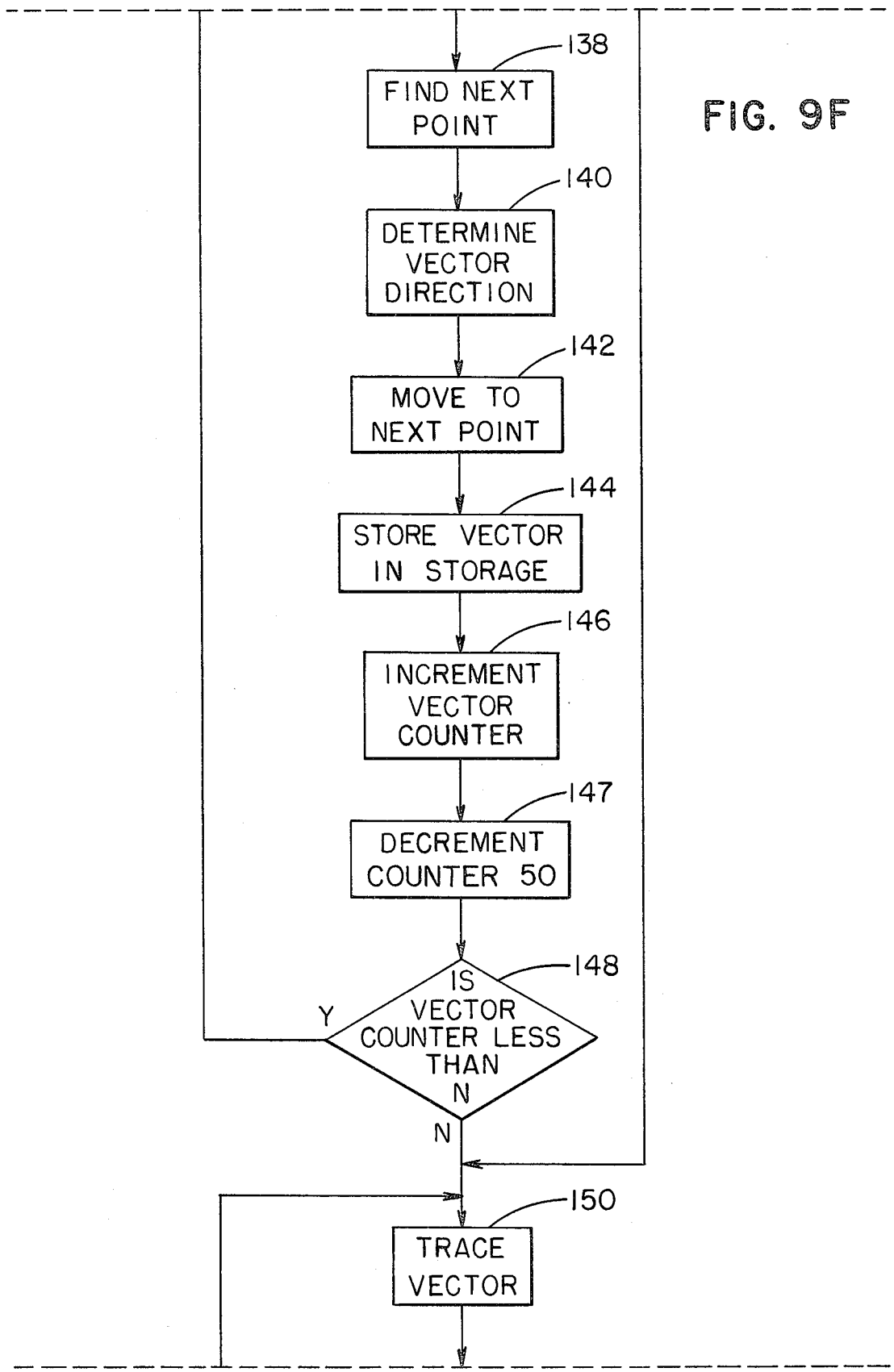

DATA COMPRESSION SYSTEM

BACKGROUND OF THE INVENTION

Modern day data processing of documents, such as checks, have included proposed systems in which the digital image of the document is recorded on a recording medium such as tape for transmission to a remote station. Prior methods of recording such images consisted of scanning the document and storing on a recording medium such as magnetic tape the pattern of the image in the form of binary data bits for transmission to a remote station where the image of the document is reproduced utilizing the recorded data. This has resulted in an excessively large amount of binary data which must be stored for further processing. In order to reduce this data, character thinning processes have been used to reduce the printed characters or other shapes on the document to their basic outline. Examples of such a process may be found in U.S. Pat. Nos. 3,196,398; 3,975,709; 3,846,754, and 3,863,218. While the thinning process described in these patents reduces the character to a single line configuration, the amount of binary data necessary to describe such thinned character is still substantial.

It is therefore an object of this invention to provide a system which digitally compresses an image to the least amount of digital information necessary to describe the image.

It is another object of this invention to provide a system which reduces the character to either its left-hand or right-hand boundary shape.

It is a further object of this invention to provide a system which describes the compressed image in more than one characteristic and then selects that characteristic which requires the minimum number of bits to describe the compressed image.

SUMMARY OF THE INVENTION

In order to achieve the above-described objects, the present invention discloses an apparatus and method which describes digitally the shape of the left-hand boundary of a character in the form of a sequence of Freeman direction codes. The number of binary bits required to describe the thinned character in terms of the number of corners in the character, the number of bits in the total area of the character and the number of bits required to describe the character in the Freeman code is then determined, with the system the selecting that one of such descriptions which describes the character in the minimum number of binary bits.

BRIEF DESCRIPTION OF THE DRAWINGS

FIG. 3 shows a representation of the boundary of the character in the form of a string of vectors.

FIG. 4 shows a representation of the boundary of the character before the thinning process.

FIG. 5 shows a representation of the boundary of the character after the thinning process.

FIGS. 9A–9H, inclusive, illustrates in flow diagram form the operation of a portion of the system illustrated in FIG. 1.

DESCRIPTION OF THE PREFERRED EMBODIMENT

Figure 1:
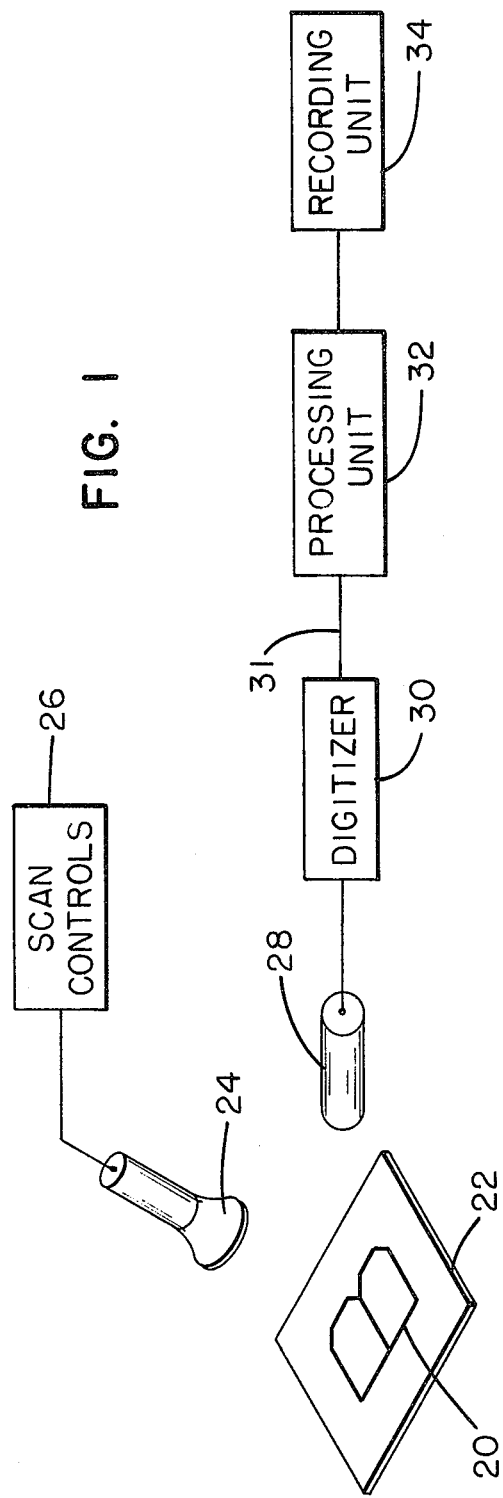
FIG. 1 is a schematic block diagram of the system for compressing the data representing a character or any other informational design in accordance with the teaching of the present invention.

Referring to FIG. 1, there is shown a schematic representation of the document processing system embodying the present invention. A character 20 which is to be recorded is, by way of example, the alphabetic character "B" located on a document 22, the document moving past the scanning station by suitable document transport means, such transport means being not shown since it is not port of the present invention. It is, of course, obvious that other forms of characters or designs found on a document can be recorded equally as well as that illustrated. The character 20 is scanned by a flying spot scanner of well known construction although it is obvious that other types of scanning systems may be employed in the present embodiment to provide the required data output. The flying spot scanner includes an optical system symbolically illustrated by a cathode ray tube 24 having scan controls 26 which produce a suitable scanning raster. The video data produced by the scanning of the character 20 is formed as a result of the reflected light being transmitted through a photomultiplier tube 28 or other type of photoresponsive device which supplies the video signals to a digitizer 30, the latter operating to generate the cartesian axis coordinates of a binary bit "1" for the dark area scanned by the scanner and a binary bit "0" for light areas in a manner well known in the art. The result of this digitizing operation is outputted over line 31 to a processing unit 32 for storage and image compression after which the minimum amount of digital data necessary to describe the character is transmitted from the processing unit 32 to a recording device 34 for recording on magnetic tape, disc or other form of recording medium.

Figure 2:
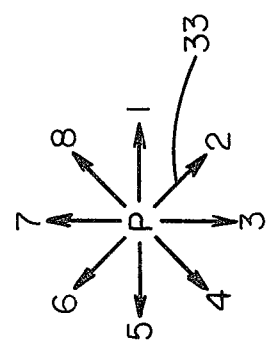
FIG. 2 is a diagram showing the binary representation of the vector directions for use in describing the boundary of the character.

In data compression or reduction as utilized in its present embodiment, all blank areas on the document are considered unnecessary and are therefore deleted. The method of data reduction used in the present invention comprises digitally describing the shape, position and size of each character using the least amount of binary data information. One method of describing the character is the employment of a vector sequence which consists of a string of numerical digits describing the shape as a sequence of unit length steps. As disclosed more fully in the article "On the Encoding of Arbitrary Geometric Configurations", by H. Freeman, IRE Trans. Elect. Computers, Vol. EC-10, No. 2, 1961, Pages 260 to 268, the boundary of the character is represented by a sequence of small vectors each of unit length and a limited set of possible directions. As shown in FIG. 2, each vector generally indicated by the numeral 33 is assigned, for example, one of the numbers 1–8, inclusive, with each point on the boundary of the character being located relative to the previous one by the coded vector digit indicating direction of the slope of the edge of the character. When representing the coded vector digit in binary form, only 3 bits are required for each digit.

Figures 3, 4, 5:
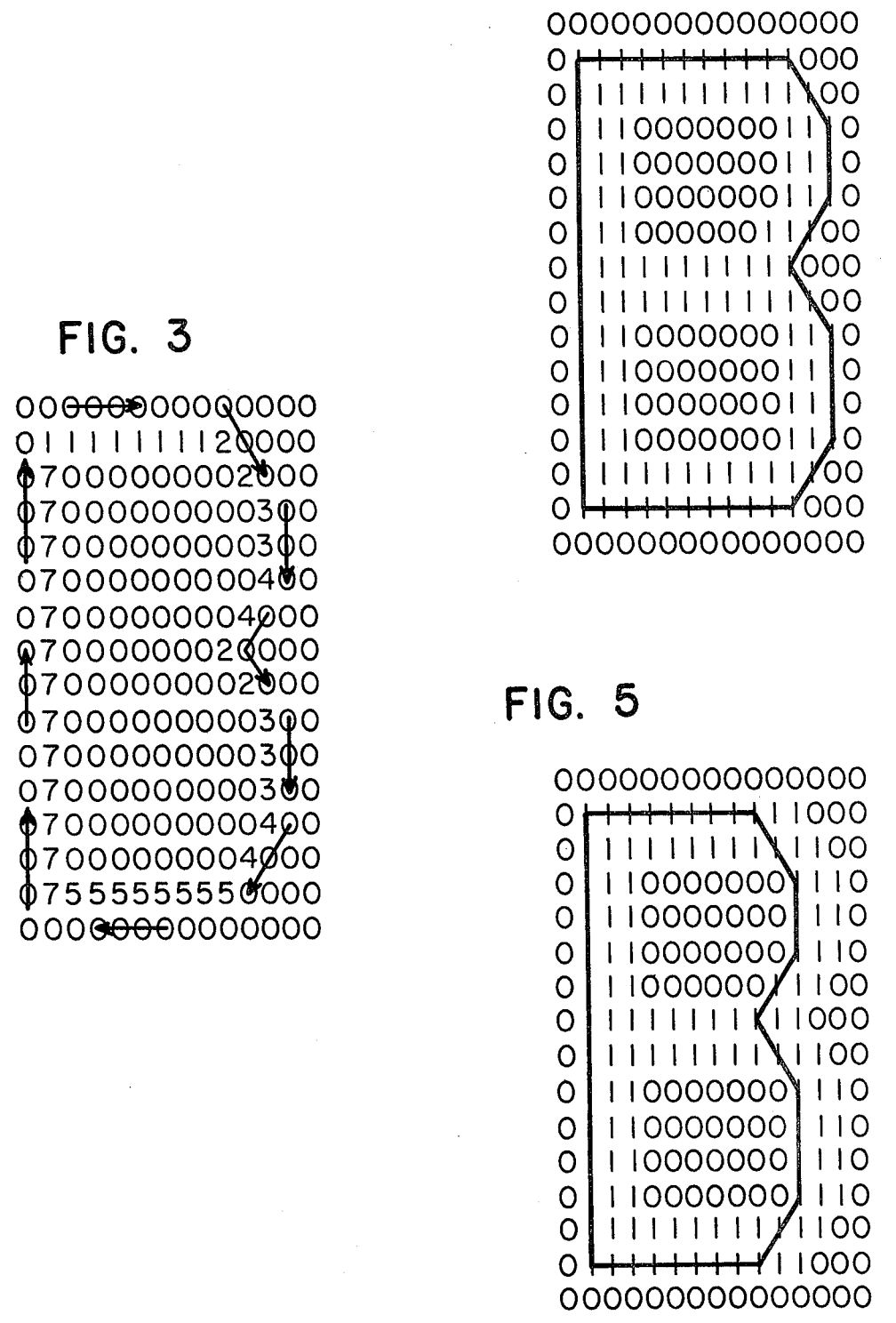

Using this method of vector direction, the character 20 can be represented as a string of digits (FIG. 3)

which indicates the direction of the slope of each succeeding vector unit. Thus, a horizontal line portion of the character extending to the right would be represented by a series of one's while a vertical line portion extending in an upright direction would be represented by a series of seven's. It is further obvious that a change in the vector string from one vector digit to another vector digit would signify a corner in the boundary of the character and the direction of the slope leading into and out of the corner. The present method of data compression includes tracing the outer boundary of the character 20 (FIG. 4) utilizing the binary digit one's, each of which forms the points in the boundary of the character. As each point in the boundary is traced by the system, the vector direction between the point being traced and the last point traced is developed and stored. The system also determines the thickness of the character at each point in the boundary. At the end of the first boundary tracing operation, data describing the outer boundary of the character in terms of a series of vectors representing the direction between each succeeding point in the boundary will have been developed. This character is shown in FIG. 3. A second tracing operation of the character 20 is then initiated and utilizing the value of the thickness generated in the first tracing operation, a reduced or thinned character is developed using the left-hand boundary as the form of the character (FIG. 5). Then using the thinned character as the model, data is developed which may be used in describing the thinned character in several different ways with the description requiring the least amount of binary data being selected for use in recording the character on a recording medium.

Figure 6:
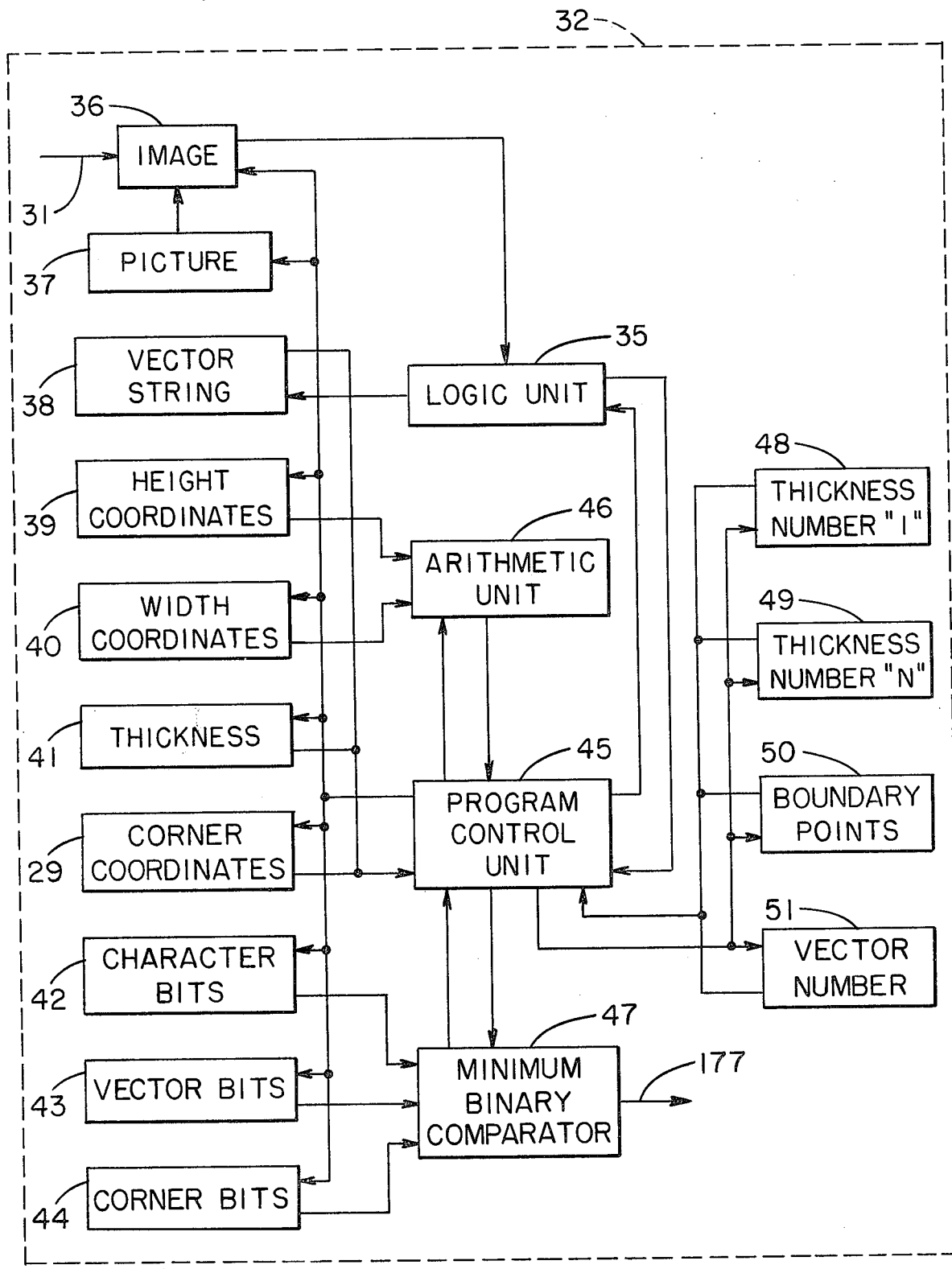
FIG. 6 is a block diagram of the processor useful in conjunction with the system of FIG. 1.

Referring now to FIG. 6, there is shown in block form the basic components of the processing unit 32 (FIG. 1) which are used to reduce the binary data representing the character 20 to a minimum value. Included in the processing unit is a logic unit 35 for determining the vector string of the character, a first storage unit 36 for storing binary data bits in an image representing the shape of the character scanned. Each data bit is stored in a location in the storage unit 36 corresponding to the cartesian coordinates of the zero's and one's which comprise the light and dark areas of the document as shown in FIG. 3, which data is received from the digitizer 30 (FIG.1) over line 31. A second storage unit 37 is provided for storing the binary data representing the character in the thinned condition.

The processing unit 32 further includes a storage unit 38 for storing the data representing the boundary of the character in terms of vectors, includes a storage unit 39 for storing data representing the coordinate of the upper limits of the character, which coordinate will represent the height of the character after the tracing of the character has occurred, includes a storage unit 40 which functions to store the width of the characters in the same manner as the height as determined in storage unit 39, includes a storage unit 41 which stores data representing the thickness of the character, which data is used in producing a thinned configuration of the character in terms of the left-hand boundary of the character, includes a storage unit 29 for storing the coordinate of the corners in the left-hand boundary of the character, includes a storage unit 42 for storing data representing the total number of bits on the picture of the thinned character determined by multiplying the height and width of the character utilizing the data in storage units 39 and 40, includes a storage unit 43 for storing data representing the total number of bits in describing the thinned characters in terms of a vector sequence, and includes a storage unit 44 for storing data representing the total number of bits in describing the reduced or thinned character in terms of the corners in the character. The data stored in the storage units 42, 43 and 44 are used in selecting which characteristic of the reduced or thinned character will be used in describing the character when the data representing the character is recorded on a recording medium.

The processing unit 32 further includes an arithmetic unit 46, performing multiplication, subtraction, etc. operations for use in determining the total number of bits in the character picture, a minimum binary comparator unit 47 for comparing the data in the storage units 42-44, inclusive, to select the minimum number of bits in the storage units 42-44, inclusive, and a plurality of counters 48, 49, 50 and 51 for use in developing the data stored in storage units 42, 43 and 44. Included in the unit 32 are a plurality of the representatively illustrated thickness counters 48 and 49, each representing a predetermined thickness of each leg of the character, which counters 48 and 49 count the number of times the corresponding thickness is determined during the tracing of the outer boundary of the character. In this regard, counter 48 will count the unit thickness while counter 49 will count those thicknesses having a width of "$n$" unit, "$n$" being any predetermined integer. When considering an E13-B character font, from two to twenty of such counters 48 and 49 would normally be desired. As each point in the outer boundary of the character is sensed by the system during the tracing of the character, the system will determine the thickness of the character at that point and increment the appropriate one of the overall counters 48 and 49 which corresponds to the thickness found. At the end of the boundary tracing of the character, the thickness counter having the highest number of count on its output will represent the thickness of the character. This data representing the thickness is then stored in storage unit 41. Counter 50 will count the number of points of the boundary of the thinned character while counter 51 will count the number of vectors in the boundary of the thinned character. Counter 50 is used to check that the character is traced completely while counter 51 is used in determining the amount of data required to describe the character using vectors as the means of description.

Figure 7:
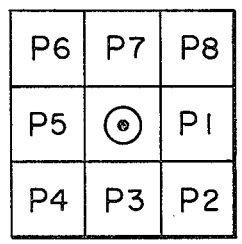
FIG. 7 is a diagram of the mask logic employed in the present invention.
Figure 8:
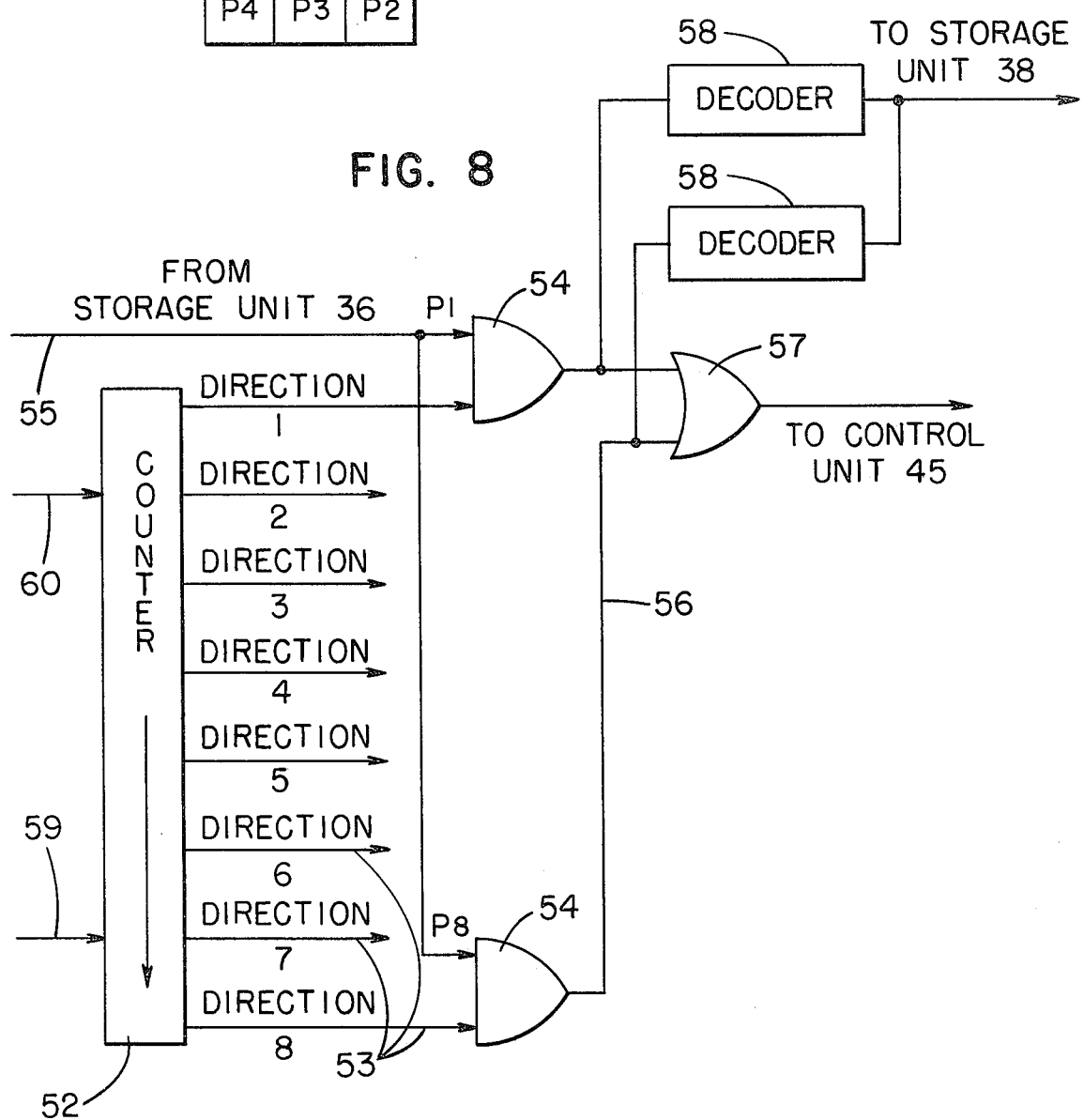
FIG. 8 is a mask logic circuit employed in the present invention.

Referring now to FIGS. 7 and 8, there is shown the mask logic used in determining the vector direction between succeeding points in the boundary of the character. As fully disclosed in the previously-cited articles by H. Freeman, the mask logic shown in FIG. 7 is applied to each point in the boundary of the character 20. Depending on which of the areas P1-P8, inclusive, of the mask logic a binary digit one is located will determine the coded digit representation of the vector extending between the point on which the mask logic is located and which is positioned in the center area of the mask logic shown in FIG. 7 and the point located in one of the areas P1-P8, inclusive. Thus, if a binary one is found in area P8, the vector direction is eight.

FIG. 8 shows a logic circuit which may be used in determining the vector digit between succeeding points in the boundary of the character in accordance with the mask logic of FIG. 7. Included in the circuit is a counter 52 having eight outputs 53, each corresponding to one of the vector directions 33 (FIG. 2). Each output 53 is connected to an input of an associated AND gate 54 whose other input is connected over line 55 to the storage unit 36 (FIG. 6) in which the image of the character 20 (FIG. 1) is stored. The output 56 of each of the AND gates 54 is connected to an OR gate 57 and to a decoder 58 whose output is connected to the vector string storage unit 38 (FIG. 6). The counter 52 is of the type which counts in the direction of the arrow shown in FIG. 8 and is preloaded over line 59 from the program control unit 45 (FIG. 6) to start counting at any of the outputs 53, such counter 52 operating by clock pulses transmitted over line 60 from the control unit 45 in a manner well known in the art. Upon sensing a binary one in the image (FIG. 4) of the character 20 (FIG. 1) stored in the storage unit 36 (FIG. 6), the system will output over line 55 the binary digit in each of the areas P1–P8, inclusive, of the mask logic (FIG. 7) which correspond to the areas adjacent the point in the image. Depending on the boundary portion of the character being traced, as will be described more fully hereinafter, the control unit 45 will preload the counter 52 to select which output of the counter will provide a binary one to its associated AND gate 54 over line 53. This will enable the AND gate 54 if its other input 55 has a binary one located therein, which occurred as a result of a binary one being found in the corresponding area of the mask (FIG. 7), and which binary one was outputted to the AND gate 54 from the storage unit 36. As mentioned above, the output of the AND gate 54 is connected to the OR gate 57 and to a decoder 58 which decodes the signal to identify the direction of the vector. The output of the decoder 58 is connected to the storage unit 38 (FIG. 6) for storing the digit representing the vector direction. The output of the OR gate 57 is connected to the program control unit 45 to signal such control unit to proceed with the next operation. As fully disclosed in the above Freeman article, the mask logic (FIG. 7) is rotated so that direction P7 of the mask logic is always orientated in a direction parallel with the vector digit found when the mask is moved to the next point in order to determine the next vector.

Referring now to FIGS. 9A–9H, inclusive, there is shown in flow chart form the method used by the system in determining the minimum amount of binary data bits required to describe the character 20 (FIG. 1). The system (FIG. 1) is initiated by the scanning of the document 22 starting, for example, at the lower left-hand corner, and scanning in a horizontal direction one line at a time until the entire document has been scanned, the video signals being digitized in the digitizer 30 to provide an image of the document which is stored (block 6 of FIG. 9A) in the image storage unit 36 (FIG. 6) of the processing unit 32, which storage unit 36 may be a portion of the memory of a microprocessor or other similar type of data processor unit. The data from the digitizer 30 describing each point of the image in the storage unit 36 includes the cartesion coordinates representing the location of the point in the original document together with the binary bit in that location.

After the image of the document 22 has been stored in the storage unit 36 (FIG. 6) in the form of binary one's and zero's as shown in FIG. 4, the system will initiate a search of the character in the image stored in the storage unit 36. Starting at the lower left-hand corner of the image and moving horizontally the system will scan the array horizontally one point at a time (block 67 of FIG. 9A) looking for a 0 to 1 transition. The process is repeated unitl a 0 to 1 transition is sensed (block 68) indicating the finding of an edge of the character. Once the edge of the character has been found, the coordinates of this first point is stored in storage units 39 and 40 (FIG. 6) and a tracing of the outer boundary of the character is initiated (block 69) to define the boundary of the character as a string of binary digits, the digits representing the vectors being stored in the storage unit 38 (FIG. 6). The operation of the mask logic (FIG. 8) is initiated (block 69) by sensing first in direction 6 (FIG. 2), then moving in a clockwise direction to direction 7, direction 8, etc. until it senses a binary one (block 70) which is the next point in the boundary of the character. After finding the next point, the digit representing the direction of the vector is stored (block 70 of FIG. 9A) in storage unit 38 (FIG. 6). The system will move (block 72) to the point found and start searching until the next binary one is found. The mask logic (FIG. 8) will always initiate the sensing operation in a direction at 90° counter-clockwise to the vector direction found at the last point under the control of the control unit 45 (FIG. 6). Referring to FIG. 3, it will be seen that as a result of this first tracing operation, the boundary of the character 20 can be defined as a series of binary digits representing a string of vector directions stored in the storage unit 38 (FIG. 6).

After the system moves to the next point found, the system will check the vector direction for vector directions 1 and 5 (block 74) which, if found, indicates that the boundary of the character is moving in a horizontal direction. In the case of the character 20 shown in FIG. 4, the top edge will be traced as a result of this operation. When the system determines that the direction of the vector is one or five, it will determine (block 76 of FIG. 9B) if the coordinates of the point are new limits in the X or Y direction. If no new limits are found, the next point (block 70 of FIG. 9A) is then searched. The coordinates of those points found which are new limits (block 76 of FIG. 9B) are stored (block 78) in storage units 39 and 40 (FIG. 6) with the coordinates of the character in the X direction being stored in storage unit 40 and the coordinate in the Y direction being stored in storage unit 39 (FIG. 6). The coordinates of each point sensed will be compared with the coordinates previously stored to determine if the coordinates are a new limit in the X and Y direction. At the end of the tracing operation the storage units 39 and 40 will contain the maximum coordinates of the character in the X and Y direction from which the height and width of the character can be determined. The system will also compare (block 80-FIG. 9B) the coordinates of the point sensed with the coordinates of the first point sensed which, if there is a comparison would indicate that the tracing of the boundary of the characters has reached the original starting point. If the coordinates are different, the next point (block 70) is searched.

Figure 9A:
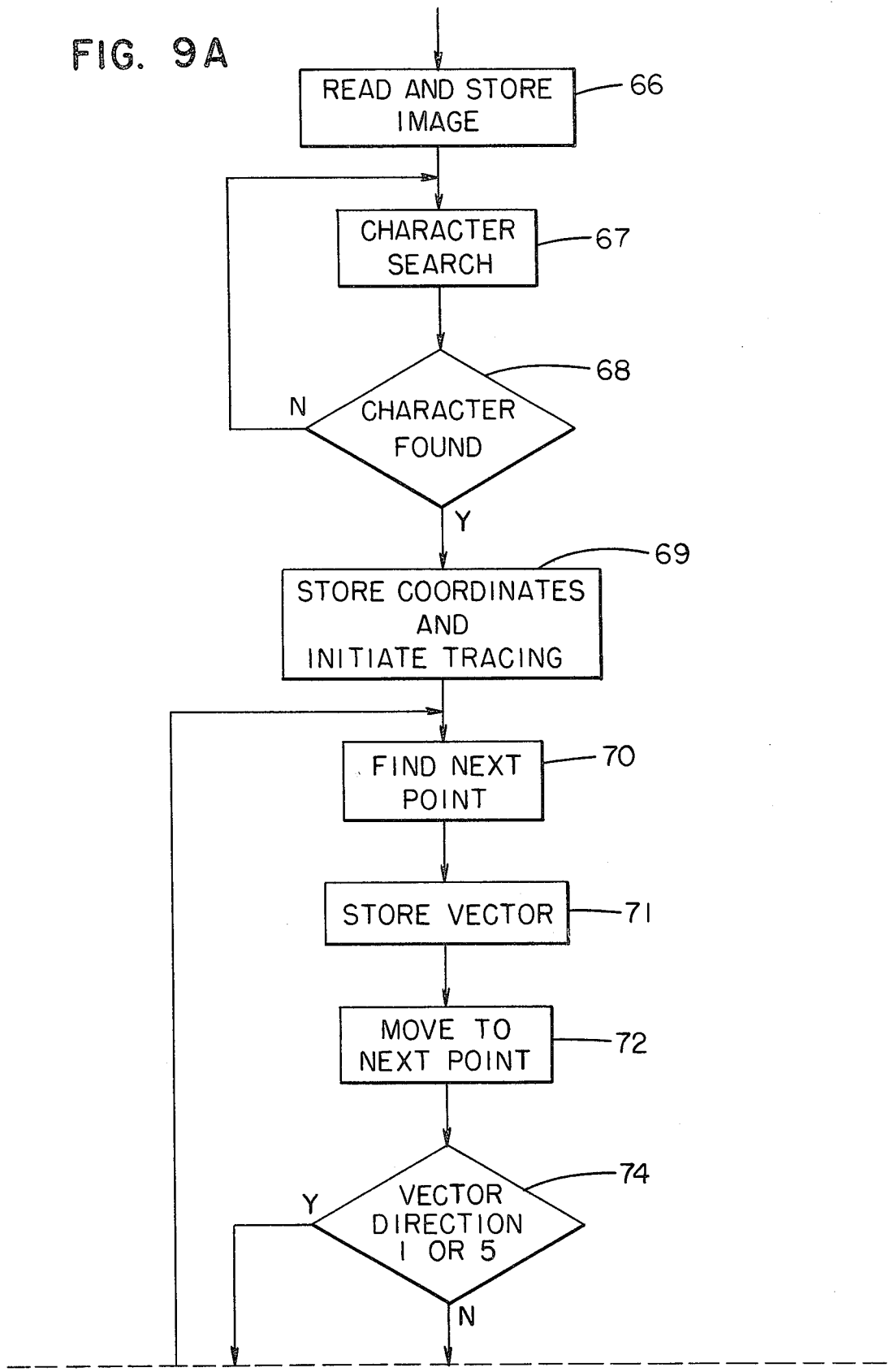
Figure 9B:
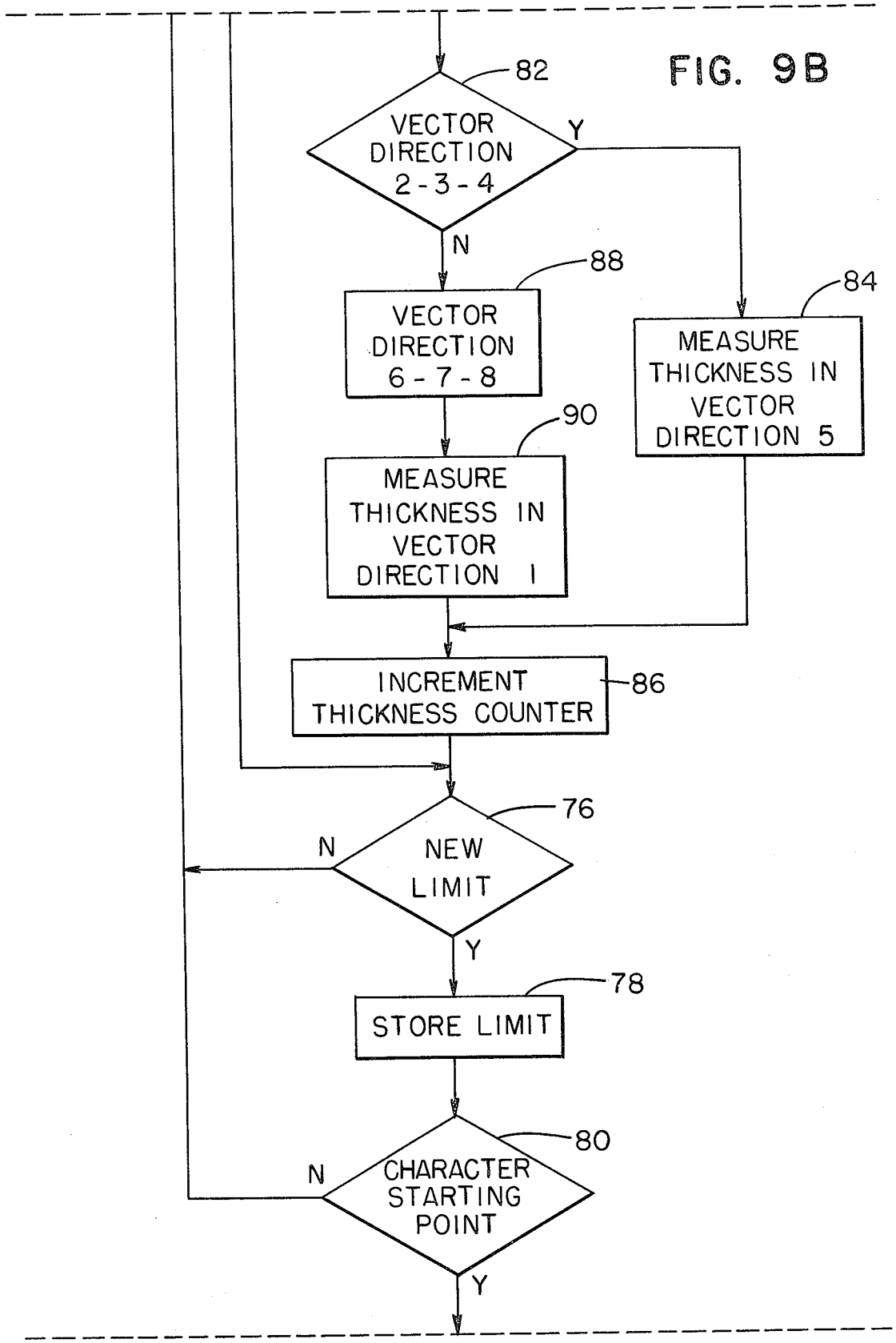
Figure 9D:
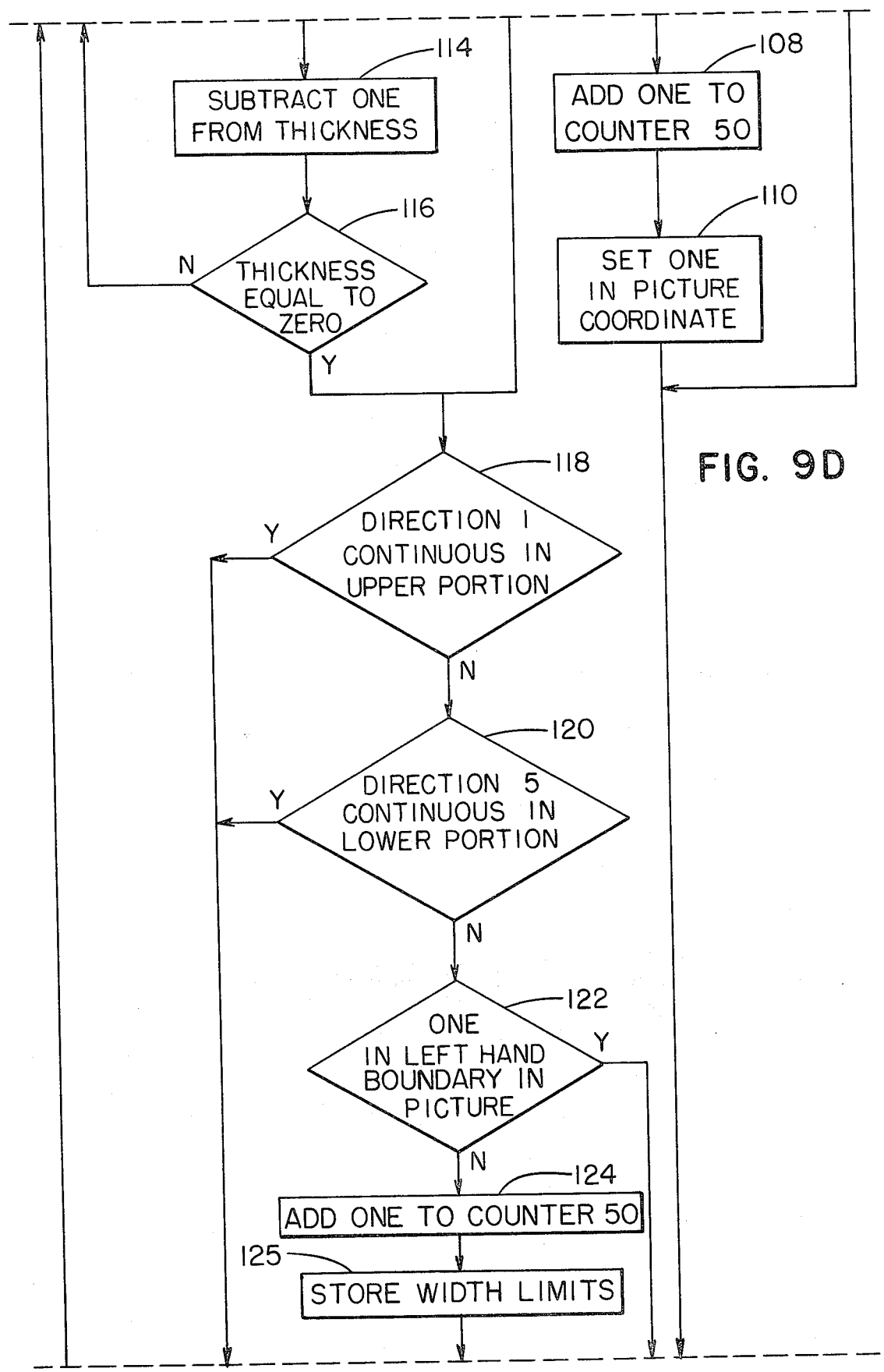
Figure 9E:
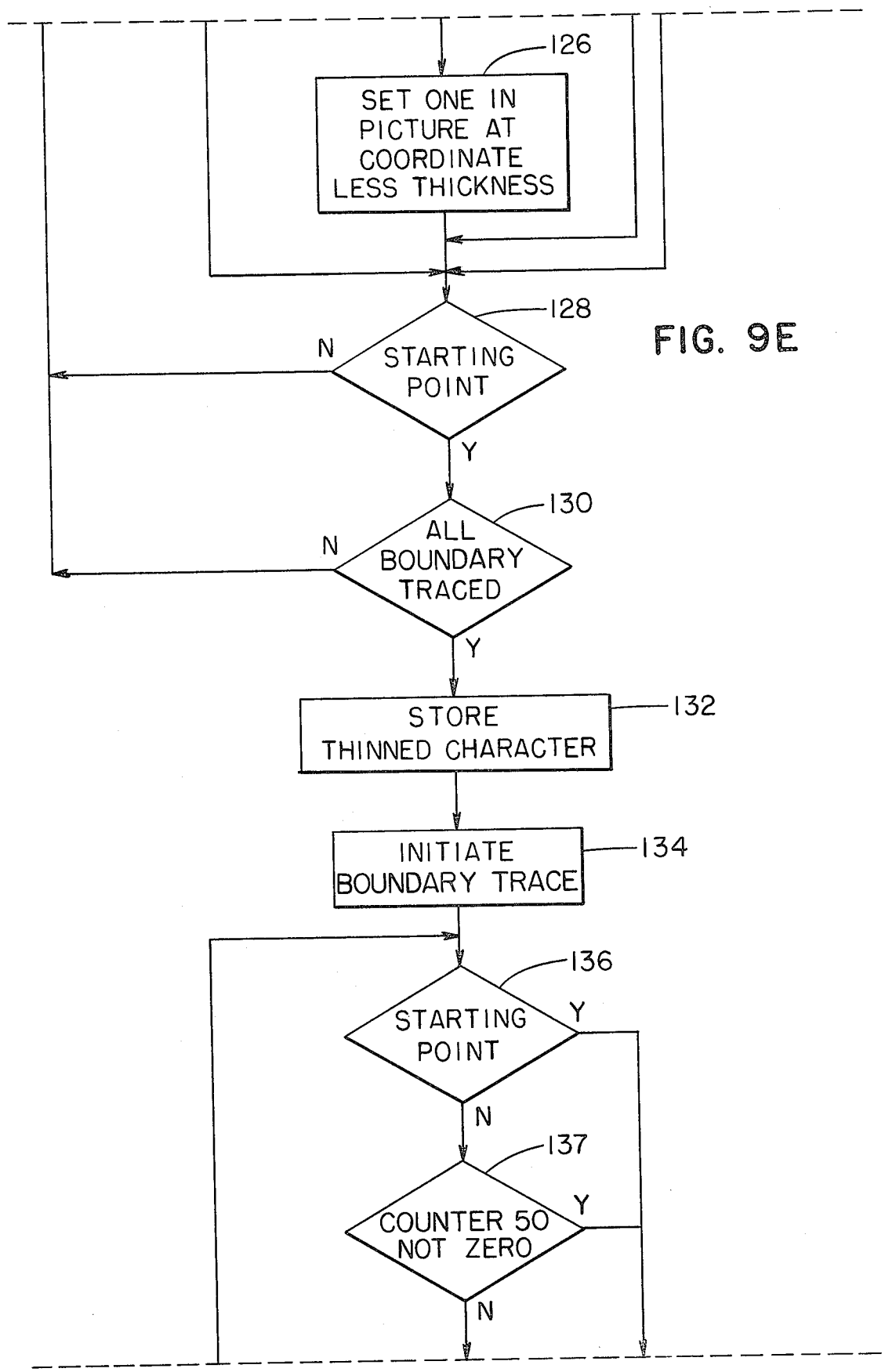
Figure 9G:
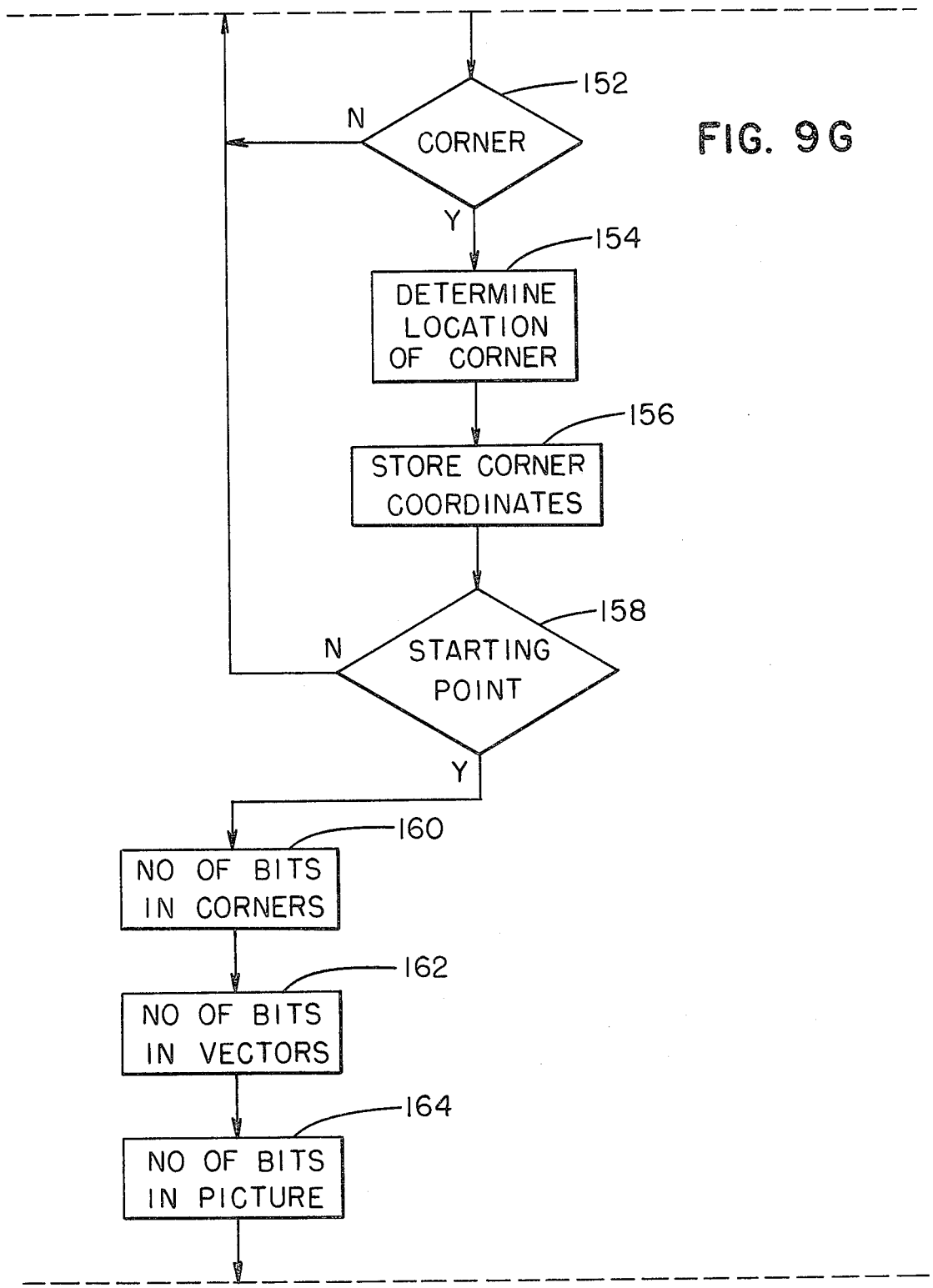
Figure 9H:
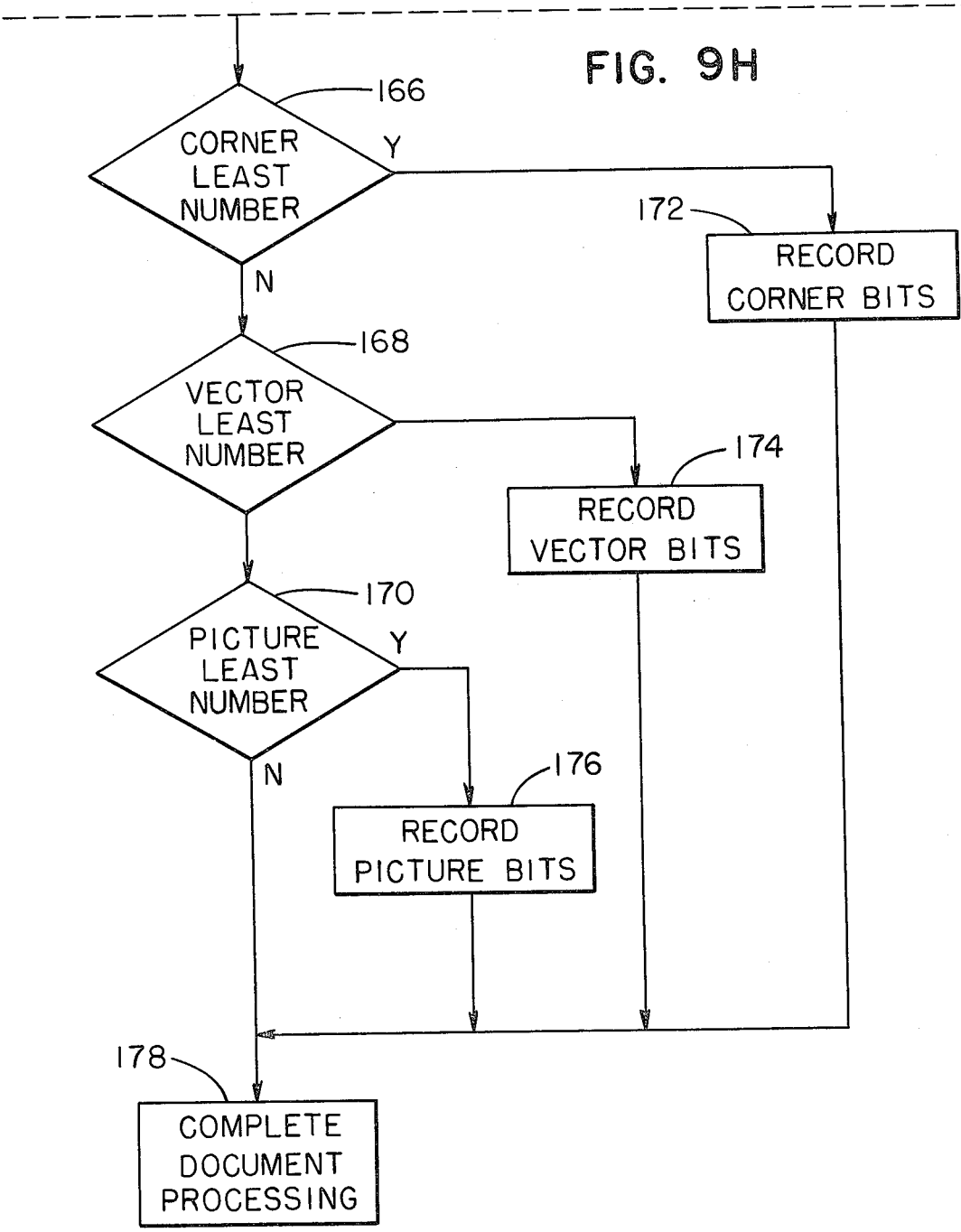

If the vector direction is found (block 74) not to be in the 1 to 5 direction, the vector direction is tested for directions 2, 3 or 4 (block 82 of FIG. 9B). If the vector is found to correspond to one of these directions indicating that the boundary of the character is extending in a downward direction, the system will search in a direction 90° to the vector direction of the point sensed and in the direction 5 (FIG. 2) thereby measuring (block 84-FIG. 9B) the thickness of the character at this point. In measuring the thickness, the system will count the number of binary one's sensed before finding a binary one to zero transition indicating the end of the portion of the character being sensed. As disclosed previously, located in the processor unit 32 (FIG. 6) are a plurality of counters represented by counters 48 and 49, each representing a predetermined character thickness. Thus, there may be a counter for each thickness of between 2 and 15 where the thickness is in terms of unit length. Each counter will count the number of times the thickness if found during the tracing of the character. The counters 48–49 corresponding to the thickness determined by the system will then be incremented by one (block 86) and the point will be tested (block 76) to determine if the coordinates of the point set a new limit.

If the result of block 82 is negative, the direction of the vectors is tested in directions 6, 7 or 8 (block 88) with the thickness being measured at right angles to the vector direction and in direction 1 (block 90 of FIG. 9B) with the appropriate thickness counters 48–49 being incremented (block 86) by one. This tracing of the boundary of the character 20 and the thickness measurement will continue until the last point in the boundary that is sensed has its coordinates cooresponding to the first point measured (block 80) indicating that the tracing operation is complete. The thickness of the character is then selected (block 92 of FIG. 96) by taking the highest count found in the thickness counters 48–49, inclusive, and storing the result in the storage unit 41 (FIG. 6)

A second boundary tracing of the image (FIG. 3) in storage unit 36 (FIG. 6) is then initiated (block 96) to reduce the boundary of the character 20 by replacing the character image shown in FIG. 4 with the character image shown in FIG. 5, which is the "left-hand" boundary of the character 20 (FIG. 1). During this second tracing of the character image, the thickness determined in block 92 and now stored in storage unit 41 (FIG. 6) will be used to place each point that is found when moving in directions 2, 3 or 4 at a point in the storage unit 37 which will correspond to the left-hand boundary of the character 20. This point will be moved in direction 5 to the new location in the storage unit 37 which is equal to the thickness of the character. During this second tracing of the outer boundary of the image, the vector direction found is tested to determine in which direction the slope of the edge of the character 20 is proceeding so as to apply the above boundary conditions when the vectors indicate the slope to be in directions 2, 3 or 4. The tracing operation is initiated (block 96) in the same manner as was previously described with respect to the first tracing operation with the operation of blocks 98, 100 and 102 of FIG. 9C performing the same function as blocks 70, 71 and 72, respectfully of FIG. 9A. The vector direction is tested (block 104) for directions 6, 7, or 8 to determine if the left-hand boundary of the thinned character image (FIG. 5) is being traced. If it is found true, the coordinates of the point found are used to check (block 106) the same coordinates in the storage unit 37 to determine if a binary one has already been inserted in that location. If a binary one is found in that location, the system will start a new point search (block 98 of FIG. 9C) after going through block 128 of FIG. 9E testing for the starting point. This procedure insures that the thinning operation does not create a new point location in the storage unit 37 that was not in the original image in storage unit 36.

If block 106 finds no point at that location in the picture in storage unit 37, the boundary point counter 50 (FIG. 6) which counts the number of points in the boundary of the character is incremented by one (block 108 of FIG. 9D) and a binary one is then inserted (block 110) in the storage unit 37 at the same coordinates. The next point (block 98 of FIG. 9C) is then found after going through block 128 of FIG. 9E. The point counter 50 is used in a succeeding tracing operation to insure that the boundary of the character is completely traced as will be explained more fully hereinafter.

If block 104 of FIG. 9C finds that the vector direction is not in directions 6, 7 or 8, the system will then move the coordinates of the point in the 5 direction (block 112) a distance equal to the thickness to determine if there is a one in that location in the image in storage unit 36. This procedure will check each point of the image for an edge point. if a one is not located, as a result of the operation of block 112, the thickness is reduced by one unit (block 114 of FIG. 9D) until the thickness is zero (block 116) indicating the point is an edge point. If a binary one is found when the thickness is not zero (block 116) indicating the point is not a part of the character, the system will search for the next point (block 90 of FIG. 9C). The direction to the next point is tested for continuation in the one direction (block 118 of FIG. 9D) or continuation in the five direction (block 120), both operations testing for the horizontal edge in the upper portion (block 118) and the lower portion (block 122) of the image. By identifying the horizontal edges of the character, the binary data required to describe the character can be reduced by indicating the number of time the vector digit is repeated. This procedure also determines that portion of the outer boundary of the character which will be reduced by the thickness of the character to establish the left-hand boundary of the character as will now be described.

If blocks 118 and 120 indicate that the direction to the next point under consideration is neither in direction five or one (FIG. 2), the point must be located in a vector direction of either 2, 3, or 4 establishing that the right-hand boundary of the character 20 (FIG. 4) is being traced requiring that the point be positioned in the left-hand boundary of the picture in the storage unit 37. Block 122 tests the left-hand boundary position of the point in the storage unit 37 by moving the coordinates of the point in the five direction equal to the value of the thickness stored in storage unit 41 (FIG. 6) to see if a one is already in that position. If it is, block 128 is tested and if it is not the starting point, the next point is traced (block 98). If a one is not found in the tested position, the point counter 50 is incremented by one (block 124), the coordinates of the left-hand boundary points are stored in the width storage unit 40 (block 125) as the new width limits, and a binary one is placed in the storage unit 37 (block 126-FIG. 9E) corresponding to the left-hand boundary of the image in storage unit 36. This procedure is repeated unitl the coordinates of the last point traced coincide with the coordinates of the starting point (block 128) indicating that the boundary (block 130) of the image in the storage unit 36 has been traced. The picture of the thinned character is then transferred to the storage unit 36 (block 132) replacing the original image. The bit counter 50 at this time will contain a count equal to the number of points in the boundary of the thinned character which will be used to check the tracing of the boundary in a manner that will now be described.

The thinned character (FIG. 5) now stored in storage unit 36 is tested to determine the number of bits required to described the character when using the vector string as the descriptive method. The left-hand boundary tracing procedure of the thinned character is initiated (block 134 of FIG. 9E) and the first point is checked to determine if its coordinates are that of the starting point (block 136). The bit counter 50 is also checked to determine if its output is zero which would indicate that a boundary tracing of the thinned character has already taken place. This eliminates a problem found in tracing a character such as a "U" where the starting point may be reached before completing the tracing of the character. If the coordinates do not correspond to the starting point or if counter 50 is not zero (block 137) the next point is found (block 138 of FIG. 9F). Block 140 determines the vector direction to the next point, the system moving to that point (block 142). The binary digit representing the vector is then stored in storage unit 38, the vector counter 51 (FIG. 6) is incremented by one (block 146), the point counter 50 is decremented by one (block 147), and the vector counter 51 is checked (block 148) to determine if the count at this time is less than a predetermined number $n$, which in the present example is 256, $n$ being the capacity of the storage unit 38. If the count in the counter 51 is less than $n$, the sequence is repeated until the thinned character has been traced and the storage unit 38 will contain binary data representing the vectors in the left-hand boundary of the thinned character. The vector number counter 51 will contain a count equal to the number of vectors in the thinned character (FIG. 5) at this time.

Block 150 will initiate a trace of the vector string stored in storage unit 38 to determine the number of corners in the thinned character. As previously described, each change of vector direction between two successive vectors in the vector string is a corner and a character can be described by knowing the cartersian coordinates of each corner listed in the sequence that they are found. Block 152 of FIG. 9G will compare each vector with respect to the last to determine if a corner exists. A corner exists when there is no agreement between two successive vectors. If there is agreement, the vectors will continue (block 150) to be compared until a corner is found. Once found, the location of the corner in terms of its cartesian coordinates (block 154), is stored (block 156) in storage unit 29 (FIG. 6) and the corner coordinates are compared with the first corner (block 158) to find the starting point. If the coordinates are not the starting point, the next two vectors are compared (block 150) to find the next corner. This process continues until the starting point is reached (block 158).

At this time the number of binary bits representing the corners stored in storage unit 29 is determined (block 160) utilizing the arithmetic unit 46 (FIG. 6) in a manner well known in the art with the result stored in the storage unit 44. Additionally, the count number in the counter 51 is multiplied by three in the arithmetic unit 46 to produce the number of bits required to define the characters in terms of the vector string. This result is stored in storage unit 43. The number of binary bits in the picture of the thinned character is determined (block 164) by multiplying the height times the width using the limits stored in storage units 39, 40 during the tracing of the character in block 78 and in block 125. This result is stored in storage unit 42 (FIG. 6). The outputs of the data stored in storage units 29, 42 and 43 are then outputted to a minimum binary comparator 47 (FIG. 6) to compare and select (block 166, 168, and 170 of FIG. 9H) which of the storage units contains the minimum number of binary bits. The comparator 47 will compare two of the values in storage units 29, 42 and 43 determining the minimum of the two and then compare this result with the third value. The binary data selected is then outputted (block 172, 174 and 176) over line 177 to a recording unit 34 (FIG. 1) for recording the selected character representing data in a recording medium for further processing. The processing of the document 22 (FIG. 1) in accordance with the present invention is then continued until completed (block 178).

While the invention has been shown and described in terms of a preferred embodiment thereof, it will understood that this invention is not limited to this particular embodiment and that many changes and modifications may be made without departing from the true spirit and scope of the invention as defined in the appended claims. It is therefore obvious that the right-hand boundary of the character may be developed for use in determining the minimum amount of data which describes the character.

I claim:

1. In a pattern recognition process including the steps of scanning a pattern and digitizing elemental areas of the pattern into pattern digital bits and background digital bits, a pattern recording method comprising the steps of
    (a) sensing the number of pattern digital bits representing the thickness of the pattern;
    (b) scanning the pattern digital bits comprising the outer boundary of the pattern;
    (c) storing a first portion of the outer boundary of the pattern in a first storage area;
    (d) replacing the remaining portion of the outer boundary in the first storage area with the inner boundary of the pattern by transposing the remaining portion of the outer boundary a distance equal to the thickness of the pattern;
    (e) forming vector representation of line segments connecting adjacent pattern digital bits in the boundary of the pattern stored in said first storage area;
    (f) adding the amount of digital bits in said vector representations to provide a first value;
    (g) multiplying the amount of digital bits in the height of the character stored in said first storage area by the amount in the width of said pattern to provide a second value;
    (h) and recording on a recording medium the minimum value between said first and second values provided in steps (c) and (d).

2. The method of claim 1, wherein said steps of sensing the number of pattern bits representing the thickness of the pattern comprises the steps of
    (a) scanning the pattern digital bits forming the outer boundary of the pattern;
    (b) adding the number of pattern digital bits in the pattern stored in a horizontal direction at each pattern digital bit in the outer boundary of the pattern;
    (c) counting the number of different thicknesses sensed;
    (d) and comparing the different thicknesses to derive the thickness having the highest number of counts as the thickness of the pattern.

3. The method of claim 1 wherein the step of adding the amount of digital bits in the vector representations further comprises the steps of
    (a) assigning a digital code to the vector representations representing the direction of said line segments connecting succeeding digital bits in the boundary of the pattern stored in said first storage area;
(b) adding the number of vectors in the boundary of the pattern stored in said first storage area;
(c) and multiplying the number of vectors by the number of digital bits in the digital code.

4. The method of claim 1 wherein the step of multiplying the amount of digital bits in the height of the character by the amount in the width of the character further comprises the steps of
(a) assigning cartesian coordinates to the location of each digital bit in said first storage area;
(b) storing in a second storage area the maximum coordinates in the $x$ and $y$ direction of the digital bits in the boundary of the pattern stored in said first storage area;
(c) adding the number of digital bits in the $x$ and $y$ direction of the pattern from the stored coordinates;
(d) and multiplying the digital bits in the $x$ and the $y$ direction of the pattern to produce the number of bits in the pattern.

5. The method of claim 4 wherein the step of selecting the minimum amount of digital bits in the vector representation, and the pattern comprises the steps of
(a) storing the number of digital bits in the vector representations in a third storage area;
(b) storing the number of digital bits in the pattern in a fourth storage area;
(c) and comparing the number of digital bits stored in steps (a) and (b) to determine the minimum number of digital bits in said storage areas.

6. A method for generating the minimum amount of digital data representing a character comprising the steps of
(a) scanning the character to generate an array of digital signals representative of the configuration of the character;
(b) storing the digital signals in a first storage unit;
(c) sensing the number of digital signals in the thickness of the character;
(d) scanning the digital signals in the outer boundary of the configuration in said first storage unit;
(e) transferring the digital signals sensed in a first portion of the outer boundary of the configuration of the character to a second storage unit;
(f) storing in the second storage unit the digital signals representing the remaining portion of the outer boundary of the configuration by transposing the location of each digital signal in the remaining portion of the outer boundary along a horizontal plane equal to the thickness of the character in a direction toward said first portion of the outer boundary;
(g) generating a plurality of coded vector representations representing the direction of line segments interconnecting the digital signals in the boundary of the configuration stored in said second storage unit;
(h) determining the number of digital signals in the coded vector representations;
(i) determining the number of digital signals in the configuration of the character stored in said second storage unit;
(j) and selecting the least number of digital signals determined in steps (h) and (i).

7. The method of claim 6 wherein said step of sensing the digital signals in the thickness of the character comprises further the steps of
(a) scanning the digital signals in the outer boundary of the character stored in said first storage unit;
(b) counting the number of digital signals in the thickness of the character in a direction at right angle to the location of each digital signal in the outer boundary of the character;
(c) counting the number of different thicknesses sensed in step (b);
(d) and comparing the different thicknesses to derive the thickness having the highest number count as the thickness of the character 8. The method of claim 7 wherein the step of determining the amount of digital signals in the coded vector representations comprises the steps of
(a) determining the number of digital signals in the code assigned to the vector representation;
(b) scanning the digital signals in the boundary of the character stored in said second storage unit to develop the coded vector representations, each coded vector representation signifying the direction of the line segments interconnecting adjacent digital signals in the boundary;
(c) counting the number of coded vector representations in the boundary of the character stored in said second storage unit;
(d) and multiplying the number of vector representations by the number of digital signals in the code.

9. The method of claim 7 wherein the step of determining the number of digital signals in the configuration of the character stored in said second storage unit comprises the steps of
(a) assigning cartesian coordinates to the location of each digital signal in the second storage unit;
(b) scanning the configuration of the character stored in said second storge unit;
(c) storing the digital value of the cartesian coordinates of the farthest signals taken in the $x$ and $y$ direction from one edge of the configuration of the character stored in said second storage unit;
(d) determining the number of digital signals in the height and width of the configuration of the character from the digital values of the stored coordinates;
(e) and multiplying the number of digital signals in the height and width to produce the number of digital signals in the configuration of the character.

10. The method of claim 9 wherein the step of selecting the least number of digital signals comprises the step of
(a) storing the number of digital signals in the vector representations in a fourth storage unit;
(b) storing the number of digital signals in the configuration of the character stored in said second storage unit in a fifth storge unit;
(c) and comparing the number of binary bits stored in said fourth and fifth storage units to determine the minimum number of binary bits in said storage units.

11. A method of recording a character printed on a document comprising the steps of
(a) scanning the character to derive an array of binary bits representative of the configuration of the character whereby a character binary bit is distinguished from a background bit;

(b) storing the binary bits in a matrix of first storage areas;

(c) sensing the binary bits of a predetermined group of said first storage areas starting from a storage area containing a first character binary bit located in the outer boundary of the character and sensing the binary bits in the remaining areas within the group to locate the next character binary bit in the boundary of the character;

(d) sensing the number of character binary bits in the character at right angles to the character binary bit sensed in the outer boundary of the character to determine the thickness of the character;

(e) counting each time a number of character bits in the thickness of the character is sensed;

(f) repeating steps (c), (d) and (e) until all of the character binary bits in the outer boundary have been sensed and the thickness of the character sensed have been counted;

(g) selecting the highest number thicknesses counted as the thickness of the character;

(h) scanning the outer boundary of the character in said first storage areas;

(i) storing the portions of the outer boundary scanned corresponding to the left-hand boundary of the character in a second storage area;

(j) storing in said second storage area the remaining portion of the outer boundary scanned corresponding to the right-hand boundary of the character at a position derived by moving the character binary bits in the right-hand boundry of the character in a horizontal direction toward the left-hand boundary of the character a distance equal to the thickness of the character to produce the left-hand boundary of the character;

(k) tracing the character binary bits in the outer boundary of the character stored in said second storage area;

(l) assigning a coded vector representation representing the direction between each of the character binary bits in the boundary traced;

(m) generating a first binary value equal to the number of binary bits in the coded vector representations;

(n) generating a second binary value equal to the number of binary bits in the character configuration stored in said second storage area;

(o) comparing said first and second binary values to indicate the least number of binary bits generated in steps (n) and (o) on a recording medium;

(p) and recording on a recording medium the binary bits indicated in step (o) as being the least number of binary bits representing the character printed on the document.

12. The method of claim 11 wherein the step of generating a first binary value equal to the number of binary bits in the coded vector representations comprises the steps of (a) storing in a third storage area a predetermined numbered order of angular directions between each succeeding character binary bit in the left-hand boundary of the character sensed in said predetermined group of storage areas;

(b) repeating step (a) until all the angular directions between each succeeding character binary bit in the left-hand boundary of the character are stored in the third storage area;

(c) counting the number of angular directions in the third storage area;

(d) and multiplying the number of angular directions by the number of binary bits in the numbered order of angular directions.

13. The method of claim 12 wherein the step of generating a second binary value equal to the number of binary bits in the left-hand configuration of the character comprises the steps of (a) assigning cartesian coordinates to the location of each character binary bits in the second storage area;

(b) scanning the character bits in the left-hand boundary of the character in the second storage area;

(c) storing the digital value of the cartesian coordinates of the farthest character binary bit taken on the x and y direction from one edge scanned in the left-hand configuration of the character in a foruth and fifth storage area of the processor, respectively;

(d) counting the number of binary bits in the height and width of the character from the digital value stored in the fourth and fifth storage areas;

(e) and multiplying the number of binary bits in the height and which of the character to derive the number of binary bits in the character.

14. The method of claim 13 further comprising the steps of (a) comparing adjacent numbered order of angular directions stored in the third storage area to indicate a change of direction in the left-hand boundary of the character;

(b) assigning cartesian coordinates to the location in the second storage area of each change in direction;

(c) storing the digital value of the cartesian coordinates of each direction change in a seventh storage area;

(d) adding the number of binary bits in the digital values stored in the seventh storage area;

(e) and selecting the minimum number of binary bits determined with respect to the angular directions, the character and the direction changes.

15. The method of claim 14 wherein the step of selecting the minimum number of binary bits comprises the steps of (a) storing the number of binary bits in the angular directions in a eighth storage area;

(b) storing the number of binary bits in the character in a ninth storage area;

(c) storing the number of binary bits in the angular direction changes in a tenth storage area;

(d) and comparing the number of binary bits stored in said eighth, ninth and tenth storage areas of indicate the storage area containing the minimum number of binary bits.

16. In a pattern recognition system having means for digitizing an analog pattern digital bits and background digital bits, means for determining the minimum amount of data describing the pattern comprising (a) means for storing pattern digital bits representing a character;

(b) means for forming vector representation of line segments connecting adjacent pattern digital bits in the boundary of the character stored in said storage means;

(c) means for adding the number of digital bits in said vector representation to produce a first digita value;

(d) means for multiplying the number of digital bits in the height and width of the character to produce a second digital value;

(e) and means for comparing said first and second digital values for indicating the minimum amount of digital bits between the vector representation and the pattern and background digital bits.

* * * * *

UNITED STATES PATENT OFFICE
CERTIFICATE OF CORRECTION

Patent No. 4,087,788     Dated May 2, 1978

Inventor(s) Brian J. Johannesson

It is certified that error appears in the above-identified patent and that said Letters Patent are hereby corrected as shown below:

Cover page, column 1, line 5, "Calif." should be -- Canada --.
"         "      "      "    " 7, "Calif." should be -- Canada --.

Column 10, line 50, "steps" should be -- step --.

Column 13, line 51, delete "on a recording medium".

Column 14, line 25, "which" should be -- width --.

Column 15, line 2, "digita" should be -- digital --.

Signed and Sealed this

Nineteenth Day of September 1978

[SEAL]

Attest:

RUTH C. MASON
*Attesting Officer*

DONALD W. BANNER
*Commissioner of Patents and Trademarks*